Figure 1:
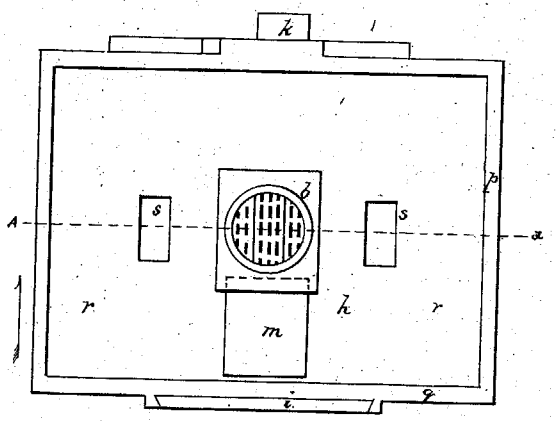
Figure 2:
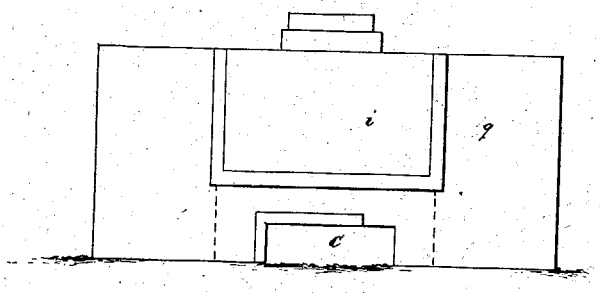
Figure 3:
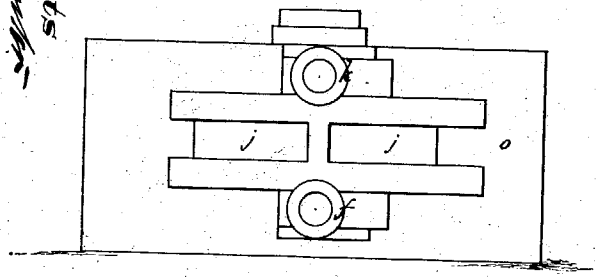
Figure 4:
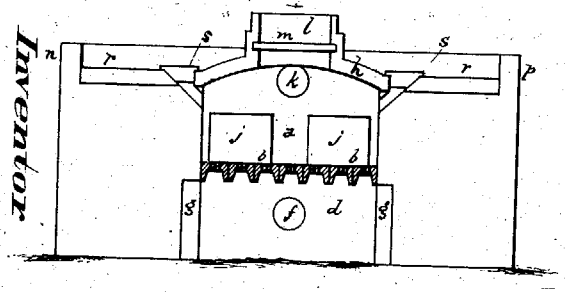

G. T. LEWIS & E. O. BARTLETT.

Process of Making Lead Pigment.

No. 8,943. Reissued Oct. 21, 1879.

Attests

R. S. Chilton

Inventor

Geo T. Lewis and E. O. Bartlett by his atty. Geo. H. Harding.

UNITED STATES PATENT OFFICE.

GEORGE T. LEWIS, OF PHILADELPHIA, PENNSYLVANIA, AND EAYRE O. BARTLETT, OF JOPLIN, MISSOURI.

IMPROVEMENT IN PROCESSES OF MAKING LEAD PIGMENTS.

Specification forming part of Letters Patent No. 206,680, dated August 6, 1878; Reissue No. 8,943, dated October 21, 1879; application filed October 2, 1879.

*To all whom it may concern:*

Be it known that we, GEORGE T. LEWIS, of Philadelphia, Pennsylvania, and EAYRE O. BARTLETT, of Joplin, in the State of Missouri, have invented a new and useful Improvement in the Manufacture of Dry White Lead and White-Lead Pigment from Galena, (native sulphuret of lead;) and we do hereby declare that the following is a full and exact description of the same.

Heretofore the manufacture of dry white lead from galena or the native sulphuret has been effected by roasting or desulphurizing the galena, and then mixing the residue, after roasting, with carbon, and subjecting the mixture to the action of heat in a compound reducing and oxidizing furnace, and collecting the resulting fumes in bags, as described in Letters Patent of the United States dated March 1, 1870, No. 100,353, granted to Eayre O. Bartlett, for improvement in the manufacture of dry white lead. Pulverized galena has also been showered into a bed of fuel, and the products collected in bags. We have discovered that by heating the native unroasted sulphuret of lead (galena) in mass by means of carbonaceous fuel (mixed therewith) and exposing it simultaneously to an oxidizing blast of air, a quantity of white fumes are produced suitable for a pigment.

The furnace which we have found to work well for the purposes above mentioned is commonly known as the "Wetherill Furnace," which is represented in the annexed drawings, in which—

*a* is the main chamber, the bottom *b* of which is composed of iron bars perforated with small holes of about one-quarter of an inch in diameter and about one inch apart, and preferably made slightly conical, with the larger diameter downward. The size of the holes would be such as to prevent the crushed ore and coal from falling through. These perforated bars are suitably sustained at the ends on the front and back walls, *c d*.

The ash-pit below the perforated bottom is of equal area therewith, and is provided with a door, *e*, in front, and with a hole, *f*, at the back, for the reception of a pipe from suitable blowing apparatus.

The walls *g g* and arch on top should be built of some refractory substance, such as fire-brick.

The front is entirely open, and provided with sliding doors *i*, by which it can be closed when working the process, or open to remove the residuum.

At the back there are two sliding jambs, *j j*, to give access to the main chamber for stirring the charge and for inspection.

At the back, near the arch, there is a hole, *k*, governed by a sliding damper, leading to a chimney for carrying off smoke and impure gases in the beginning of the operation on a new charge.

In the center of the roof there is an aperture, *l*, governed by a damper or sliding door, *m*, leading to a suitable apparatus for the collection of the oxidized vapors of lead.

The exterior walls, *n o p q*, may be built above the top, to form two feeding-troughs, *r r*, one on each side of the arch or roof, and provided each with an aperture or passage, *s*, leading to the inside or main chamber, and each aperture or passage is provided with a cover, to put on after the furnace has been charged.

In working with this furnace we mix together raw crushed ore (native sulphuret of lead) and carbon, preferably in the state of pea or dust anthracite coal, in the proportion of half and half, and ignite the mixture, thus forming the necessary heat. The same effect may, however, be produced by other fuel, as hereinafter set forth. Dense white vapors or fumes pass off, which are conveyed to a separate chamber, where they are strained by passing through a screen or series of screens of muslin or other textile fabric.

Lime may also be employed in the furnace, in the proportion of two hundred pounds of lime to four hundred pounds of galena, although the addition of the lime is not necessary in all cases.

We have discovered also that the above process of sublimation or oxidation can be carried on with good results either in a furnace with grate-bars, with blast introduced at pleasure from below or at the sides, or in a furnace with a solid bottom with blasts introduced into the sides.

The furnace should be such as will be capable of oxidizing the mass of heated sulphuret of lead and convert it into a pigment, and avoiding, as far as possible, the production of metallic lead. The grate or furnace can be either closed or open at the top. We find, however, that the solid bottom presents some advantages, as it does not, like the grate bottom, become filled and choked with molten material.

We have also discovered that generated gas can be used in place of coal to heat the mass.

Having thus described our invention, what we claim is—

The process of manufacturing a basis of a pigment by subjecting unroasted galena in mass to the simultaneous action of heat and blast in a furnace capable of oxidizing the sulphuret of lead, and collecting the fumes in textile fabrics, substantially as described.

GEORGE T. LEWIS.
EAYRE O. BARTLETT.

Witnesses:
R. S. CHILOP,
LISLE STOKES.